(12) United States Patent
Nielsen

(10) Patent No.: US 7,618,558 B2
(45) Date of Patent: Nov. 17, 2009

(54) PROCESS FOR CLEANING GASES FROM GASIFICATION UNITS

(75) Inventor: Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 669 days.

(21) Appl. No.: 11/399,373

(22) Filed: Apr. 7, 2006

(65) Prior Publication Data
US 2006/0233687 A1 Oct. 19, 2006

(30) Foreign Application Priority Data
Apr. 15, 2005 (DK) .......................... PA 2005 00553

(51) Int. Cl.
C01B 3/32 (2006.01)
C01B 3/34 (2006.01)
C01B 3/48 (2006.01)

(52) U.S. Cl. ............. 252/373; 48/197 FM; 423/244.01; 423/244.06; 423/648.1; 423/650; 423/651; 423/655; 502/55

(58) Field of Classification Search ................. 252/373; 423/244.01, 244.06, 648.1, 650, 651, 655; 48/197 FM; 502/55
See application file for complete search history.

(56) References Cited

U.S. PATENT DOCUMENTS 4,302,218 A * 11/1981 Friedman .................. 48/197 R
4,769,045 A 9/1988 Grindley
5,169,612 A 12/1992 Nielson

FOREIGN PATENT DOCUMENTS

WO   WO 96/30465   10/1996

OTHER PUBLICATIONS

Unites States Statutory Invention Registration H1538 to Harryman published Jun. 4, 1996.*

* cited by examiner

Primary Examiner—Wayne Langel
(74) Attorney, Agent, or Firm—Dickstein Shapiro LLP

(57) ABSTRACT

A process for cleaning gases from a gasification unit comprising the steps of:
  gasifying a fuel to raw synthesis gas comprising carbon monoxide and steam in a gasification reactor in the presence of a calcium-containing compound and steam
  removing halogen compounds from the raw synthesis gas
  catalytic conversion of carbon monoxide and steam in the raw synthesis gas to carbon dioxide and hydrogen in a water gas shift conversion step to provide a shifted gas
  contacting the shifted gas with a solid sulphur sorbent
  regenerating the solid sulphur sorbent by passing a stream of steam through the solid sulphur sorbent counter current to the flow direction of the shifted gas to provide a hydrogen sulphide-containing stream of steam
  transferring the hydrogen sulphide-containing stream of steam from the solid sulphur sorbent directly to the gasification reactor
  removing the cleaned shifted gas from the solid sulphur sorbent.

10 Claims, 1 Drawing Sheet

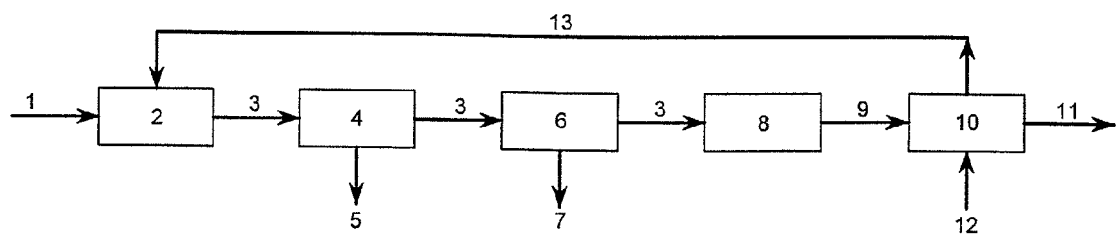

PROCESS FOR CLEANING GASES FROM GASIFICATION UNITS

FIELD OF THE INVENTION

The present invention relates to a process for cleaning of gases from gasification units and more particularly to the desulphurisation of these gases.

BACKGROUND OF THE INVENTION

The increased consumption of fossil fuels, in particular natural gas and oil, has revealed that these fuels are a limited resource. Thus, utilisation of less noble fossil fuels like heavy fuel oil and coal has become more pronounced in particular in countries which rely on import of natural gas or oil.

Coal is a major energy source for electric power generation and electricity can be produced with a high efficiency from coal by gasification. Coal can also be used as a feedstock for several chemical processes such as methanol, dimethyl ether and ammonia synthesis or for power generation by fuel cells. Coal contains many harmful impurities, for instance sulphur and halogens, and these impurities have to be removed to satisfy environmental regulations or to a level required by processes downstream gasification. Processes for cleaning coal gases resulting in very low emissions of harmful gases such as sulphur dioxide and other gases, for instance nitrogen oxides, are therefore being studied and developed worldwide.

Topical Report Number 19, Tampa Electric Integrated Gasification Combined-Cycle Project—An Update (July 2000), published by The Office of Fossil Energy, the U.S. Department of Energy on the following internet address:

http://www.fe.doe.gov/programs/powersystems/cleancoal/publications/ discloses a coal gasification process used to fuel a gas turbine generator, which has an exhaust that is integrated with a heat recovery steam generator and a steam turbine generator for power generation. Coal is partially oxidised in a gasifier with 95% pure oxygen to produce raw synthesis gas which is then cooled and washed with water for particulate removal followed by washing with water to convert carbonyl sulphide (COS) to hydrogen sulphide($H_2S$). After additional cooling, the raw synthesis gas is sent to a conventional acid gas removal unit, where $H_2S$ is absorbed by scrubbing with an amine solvent. $H_2S$ is removed from the amine by steam stripping and sent to the sulphuric acid plant.

Technical Progress Report Gasification Test Run GCT2, DOE Cooperative Agreement Number DE-FC21-90MC25140 (Apr. 10-27, 2000) available on the following internet address:

http://psdf.southernco.com/tech_progress_reports.html discloses a process for cleaning coal gas in which a fluidized bed reactor operating as either a combustor or a gasifier is fed with coal particles and a sorbent material such as limestone or dolomitic sorbents. The sorbent material captures any sulphur present and converts it to calcium sulphide (CaS). The gas stream leaving the gasifier is passed through a barrier filter to filter out dust from the reactor. The gas stream is then sent to a thermal oxidiser to oxidise all reduced sulphur compounds ($H_2S$, COS, $CS_2$) and reduced nitrogen compounds ($NH_3$, HCN). Gasification solids are processed in a sulfator to oxidise CaS to calcium sulphate ($CaSO_4$) suitable for commercial use or disposal. Alternatively, the gasification solids could be burned to recover the heating value of the residual carbon content.

U.S. Pat. No. 5,169,612, incorporated herein by reference, discloses a process whereby sulphides are removed from gas streams by contacting the gas stream with a solid absorbent containing tin oxides and a stabilising component, and thereafter regenerating the absorbent by contacting it with steam. The solid absorbent has an active absorption component of tin, tin oxides or mixtures thereof, and a carrier material which can be a refractory material such as clays, silicates, alumina and titania. In addition a stabilising component may be present. The formation of sulphates as by-products are avoided.

U.S. Pat. No. 4,769,045 discloses a process whereby sulphur-containing gas from a gasifier is passed through an external bed of a regenerable solid absorbent of preferably zinc ferrite for desulphurising the gas. The absorbent is regenerated by passing a mixture of steam and air or oxygen through the bed for converting absorbed hydrogen sulphide to sulphur dioxide. The resulting gas mixture of sulphur dioxide and steam is sent to the gasifier for conversion by a calcium compound into a stable form of sulphur such as calcium sulphate.

Due to the low pressure of the obtained stream of produced sulphur dioxide and steam, further compression is required before transfer to the gasifier, since the gasifier operates at a higher pressure.

WO patent application No. 96/30465 discloses a process similar to the process disclosed in U.S. Pat. No. 4,769,045. Sulphur dioxide is formed during regeneration of the sorbent. The regeneration offgas is passed into an ejector to increase its pressure to at least a level equal to the pressure of the gasifier. Air is used as motive gas in the ejector.

U.S. Pat. No. 6,428,685 discloses a process for removing sulphur from a stream of cracked-gasoline or diesel fuel. The process includes contacting the stream with a sorbent composition of zinc oxide, silica, a promoter metal, alumina and a calcium compound. The sorbent is regenerated by desulphurising the sorbent using an oxygen-containing gas such as air, and thereafter reducing the promoter metal in the sorbent to metal with a reducing agent.

A hot gas cleaning process is disclosed by P.E. Højlund Nielsen et al. in Hot Gas Cleaning of Coal Gases by Sequential Absorption, Proceedings of the Twelfth Annual International Pittsburgh Coal Conference, (Sep. 11-15, 1995) pages 1074-1079, incorporated herein by reference. A process for deep desulphurisation of coal gases using a "sandwich" absorbent composed of two different absorbents based on tin dioxide ($SnO_2$) and zinc oxide (ZnO), respectively. Tin dioxide is used for bulk desulphurisation, while zinc oxide is used in a polishing mode. This allows the use of steam with a small addition of oxygen as a regeneration agent. The regeneration gas contains hydrogen sulphide, allowing the recovery of sulphur as elemental sulphur by for instance a Claus unit or the conversion of $H_2S$ to concentrated sulphuric acid by a wet sulphuric acid unit.

Sigurdardottir, I.D. et al. have tested the use of a sorbent sandwich based on tin oxide and zinc oxide sorbents as a desulphurisation agent using coal gases and regeneration of the sorbent sandwich using steam containing oxygen. This is further described in the proceedings of 1995 Annual Meeting Session No. 259, American Institute of Chemical Engineers, Miami Beach, Fla., Nov. 12-17, 1995, incorporated herein by reference.

The disadvantage of the above mentioned processes is that the sorbent regeneration loop results in steam containing hydrogen and hydrogen sulphide and recovery of sulphur as elemental sulphur is costly. There is therefore a need for a simpler process.

It has now surprisingly been found that by converting sulphur to hydrogen sulphide during regeneration and by returning the hydrogen sulphide-containing regeneration steam directly to the gasifier all sulphur is removed as calcium sulphide.

Advantageously, additional pressurizing of the hydrogen sulphide-containing regeneration steam in order to raise the pressure to a level equivalent to the pressure in the gasifier is not necessary.

It is an objective of the invention to provide a simple process with a high thermal efficiency for cleaning gases from gasification units.

It is also an object of the invention to provide a cleaned shifted gas from a gasification unit suitable for use in the preparation of for instance ammonia or methanol.

SUMMARY OF THE INVENTION

The present invention deals with a process for cleaning gas from a gasification unit in which the environmental impact of sulphur may be drastically reduced.

The invention concerns a process for cleaning gas from a gasification unit, in which for instance, coal or fuel oil has been gasified to produce a raw synthesis gas removing particulates and halogens from the raw synthesis gas subjecting the gas to a water gas shift reaction step followed by removal of sulphur using an absorbent and regenerating the absorbent.

The inventive process comprises the steps of:
  gasifying a fuel to raw synthesis gas comprising carbon monoxide and steam in a gasification reactor in the presence of a calcium-containing compound and steam
  removing halogen compounds from the raw synthesis gas
  catalytic conversion of carbon monoxide and steam in the raw synthesis gas to carbon dioxide and hydrogen in a water gas shift conversion step to provide a shifted gas
  contacting the shifted gas with a solid sulphur sorbent
  regenerating the solid sulphur sorbent by passing a stream of steam through the solid sulphur sorbent counter current to the flow direction of the shifted gas to provide a hydrogen sulphide-containing stream of steam
  transferring the hydrogen sulphide-containing stream of steam from the solid sulphur sorbent directly to the gasification reactor
  removing the cleaned shifted gas from the solid sulphur sorbent.

BRIEF DESCRIPTION OF THE FIGURE

The sole drawing is a flow diagram illustrating an embodiment of the inventive process.

DETAILED DESCRIPTION OF THE INVENTION

The invention relates to a process for cleaning gases from gasification units. The invention is particularly directed to hot gas cleaning, whereby the gas is conditioned before warm gas desulphurisation. By hot gas cleaning is meant the process whereby impurities such as particulates, halogens, sulphur and nitrogen compounds are removed. The process is applicable for treatment of fuels such as coal gases and heavy fuel oil, which typically have high sulphur content.

Hot gas cleaning of gases from gasification units in comparison to cleaning of gases from conventional coal-fired plants may provide improvements in thermal efficiency and low emissions of harmful gases such as nitrogen oxides and sulphur dioxide.

The invention will be described in more detail in the following:

In a first step a fuel comprising a raw material such as coal, for instance high rank coal or heavy fuel oil, is gasified in a gasification reactor to raw synthesis gases containing a high concentration of carbon oxides such as carbon monoxide and carbon dioxide. Any type of gasification reactor is useful in the gasification step. However, it is preferable that the gasification reactor is a fluidised bed reactor or a transport or entrained flow reactor such as the reactor described earlier in the Technical Progress Report Gasification Test Run GCT2, DOE Cooperative Agreement Number DE-FC21-90MC25140 (Apr. 10-27, 2000).

This reactor is provided with a burner at the reactor mixing zone to burn the gas and oxidise reduced sulphur compounds ($H_2S$, COS, $CS_2$) and reduced nitrogen compounds ($NH_3$, HCN). However, some amounts of sulphur in the form of $H_2S$ are not oxidised. The fuel and a sulphur sorbent material are therefore separately fed into the reactor. Sorbent material ground into the required particle size is fed into the reactor for sulphur capture thereby decreasing the need for downstream facilities to reduce plant sulphur emissions.

Suitable temperatures for the gasification reaction are typically equal to or above 800-900° C. This temperature is suitable for fuels that are of the lignite or biomass type. Temperatures above 800-900° C. and equal to or below 1600° C. are suitable for fuels of high rank coal or heavy fuel oil.

Water is produced during the gasification process. If a slurry gasification reactor is used the raw material to be gasified is fed in a slurry with a high water content. In some other types of gasification reactors water or steam is used to control the gasification temperature. In all cases the raw synthesis gas produced is typically in water gas shift equilibrium at the gasification temperature.

A suitable sulphur sorbent material for use in the gasification reactor is calcium carbonate ($CaCO_3$) in the form of for instance limestone. At temperatures above 900° C. calcium carbonate decomposes to calcium oxide (CaO) and carbon dioxide. Calcium oxide or calcium carbonate react with sulphur present as hydrogen sulphide in the gas phase, according to equations (1) or (2), thereby reducing the amount of sulphur in the gas phase by converting it to calcium sulphide (CaS).

$$H_2S + CaO = H_2O + CaS \quad (1)$$

$$H_2S + CaCO_3 = H_2O + CO_2 + CaS \quad (2)$$

Reaction (1) determines the equilibrium sulphur level.

The raw synthesis gas produced in the gasification unit contains a high concentration of the carbon oxides CO and $CO_2$. These gases react with $H_2S$ according to reactions (3) and (4).

$$CO + H_2S = COS + H_2 \quad (3)$$

$$CO_2 + H_2S = COS + H_2O \quad (4)$$

The water gas shift reaction (5) also takes place and is in equilibrium with reactions (3) and (4) during coal gasification.

$$CO + H_2O = CO_2 + H_2 \quad (5)$$

At the gasification temperature the water gas shift reaction is shifted towards the left leading to increased production of steam and carbon monoxide.

If carbon disulphide $CS_2$ is formed it is present in minute amounts.

Other sorbent materials suitable for use in the gasification reactor are minerals containing calcium carbonate for example calcite ($CaCO_3$) and dolomite ($CaMg(CO_3)_2$) and other calcium containing materials as such.

Typical sulphur content in the raw synthesis gas is approximately 200-400 ppm depending on the steam content of the gas. This can correspond to a sulphur removal of 90-95% if the gas initially had a sulphur content of 1%. Calcium sulphide can be further processed to calcium sulphate ($CaSO_4$) suitable for commercial use or disposal.

The raw synthesis gas comprises as main components carbon monoxide, carbon dioxide, hydrogen and steam.

After gasification, dust and fine ash can optionally be removed from the raw synthesis gas by passage through a particulate control device. This could for example comprise a filter system with ceramic or metal filter elements e.g. ceramic candles.

The raw synthesis gas is then subjected to a halogen removal step in which halogens such as hydrochloric acid (HCl) are removed. Chlorine can act as a poison for catalysts and can cause corrosion in piping and equipment. Hydrochloric acid can also react with tin oxide ($SnO_2$) at a later stage of the process leading to the formation of undesirable tin chlorides such as $SnCl_2$ and $SnCl_4$. The halogen removal step could for example be done by using commercial guards such as halogen absorbents e.g. HTG-1, which is based on potassium carbonate on an activated alumina carrier from Haldor Topsøe A/S or another alkali carbonate supported on a carrier.

The composition of the raw synthesis gas is not suitable for use in preparation of for instance methanol, ammonia or other end products, and the concentrations and ratios of the components of the raw synthesis gas have to be adjusted to fulfil the requirements as raw materials for the preparation of these end products. The raw synthesis gas is therefore passed through a water gas shift step in which the concentrations of the components are adjusted.

An adiabatic shift reactor is useful for converting carbon monoxide and steam to carbon dioxide and hydrogen as shown in equation (5). The temperature rises typically 25-50° C. from 400° C. to 450° C. Commercially available catalysts are suitable for use in the shift step. An example is the SSK sulphur tolerant shift catalyst from Haldor Topsøe A/S containing supported molybdenum optionally also containing cobalt or nickel. After the water gas shift reaction the shifted gas has a temperature of approximately 450° C.

Suitable operating temperatures for the shift reaction are 200-500° C., preferably 250-450° C. Suitable operating pressures for the shift reaction are at least 1 MPa. A preferable pressure range is 4-10 MPa. Most preferably the pressure is 10 MPa.

After ended shift reaction the shifted gas is transferred to a solid sulphur sorbent in a reactor downstream the water gas shift reactor for further purification. The active sorbent component can be supported on a carrier material, which can be any known refractory material stable at elevated temperatures. Suitable carrier materials are clays, silicates, alumina and titania. Preferably, the carrier material is alumina or titania. A stabilising component may be added to the sorbent. Details of suitable sorbent materials and their preparation are given in U.S. Pat. No. 5,169,612 incorporated herein by reference.

During desulphurisation the sulphur sorbent is sulphided by the sulphur components in the shifted gas, thereby desulphiding the shifted gas.

The sulphur content of the raw synthesis gas comprises primarily CaS, COS and $H_2S$. $CS_2$ may be present in minute amounts. These sulphur compounds leave the gasification reactor in amounts of 200-400 ppm depending on the steam content of the gas. The sulphur content of the shifted gas can be further reduced by contacting the gas with a solid sorbent based on metals or metal oxides, for instance tin or tin oxides or mixtures of these components in a desulphurisation step according to equation (6), where Me represents the metal used:

$$H_2S + MeO = MeS + H_2O \tag{6}$$

Alternatively a multilayered reactor placed downstream the water gas shift reactor can be used and this allows the use of layers of different supported sorbents. An advantageous multilayer combination is exemplified in an embodiment of the invention having a first layer comprising a tin oxide based sorbent and a final sorbent layer comprising a metal such as copper or nickel supported on a carrier such as alumina. Other intermediate oxide based sorbents based on for instance, manganese oxide, may be placed between the first and the final layers. However, the last intermediate sorbent layer before the final layer of supported copper or nickel is a layer of zinc oxide as the active component.

The tin oxide sorbent is used for bulk desulphurisation and the zinc oxide layer is used in the polishing mode for removing small amounts of sulphur. An additional advantage of the above-mentioned layer combination is that it allows the use of steam with a small addition of oxygen as a regeneration agent. A reduction in the amount of steam used is obtained in comparison to using only steam as regenerating agent.

In contrast to this, another advantage is that the regeneration gas contains hydrogen sulphide and not sulphur dioxide when the oxygen amount is minimized.

The desulphurisation step occurs at temperatures of 400-500° C. The process is based on the equilibrium reaction shown in equation (7):

$$H_2S + H_2 + SnO_2 = SnS + 2H_2O \tag{7}$$

Reduction of the steam content has a drastic effect on the level to which the desulphurisation can be carried out. The equilibrium constant expressed as partial pressure for equation (7) is as follows in equation (8):

$$K_P = (P_{H2O})^2 / (P_{H2} \cdot P_{H2S}) \tag{8}$$

Not only is the partial pressure of water reduced at a given equilibrium constant, but the partial pressure of hydrogen is increased. Thus, the partial pressure of $H_2S$ is reduced considerably as shown in equation (9).

$$P_{H2S} = (P_{H2O})^2 / (P_{H2} \cdot K_p) \tag{9}$$

This effect is not so drastic with the zinc oxide sorbent as shown in equation (10).

$$H_2S + ZnO = ZnS + H_2O \tag{10}$$

Subsequently, regeneration of the sulphided sorbent materials takes place by subjecting the sulphided sorbent to steam flowing in a direction opposite to the flow direction of the shifted gas during absorption i.e. the steam flows counter current to the flow of the shifted gas. During regeneration a small amount of air or oxygen, typically less than 1 volume %, may be added to the steam. This allows for a reduction in the total steam requirement as mentioned earlier. The regeneration takes place at 400-500° C. at a pressure above the pressure of the gasification reactor.

Superheated steam at pressures of 2-5 bars (0.2-0.5 MPa) above the gasification pressure is diluted with air or oxygen so it contains up to 1-2% of oxygen. Preferably, the amount may be much lower. The regeneration takes place in a direction opposite to the direction during desulphurisation. Thus, in the multilayered reactor the first bed contacted is for example the sorbent layer comprising copper or nickel. The second layer contacted is the layer having zinc oxide as the active component, in which zinc sulphide, ZnS, is present. The formation of zinc sulphate, ZnSO$_4$, can be suppressed using steam and oxygen in the required proportions.

The regeneration stream then passes through the intermediate beds before contacting the tin oxide, SnO$_2$, layer. This layer also contains tin sulphide, SnS. The presence of sulphur dioxide and oxygen from the proceeding beds helps in speeding up the regeneration while keeping the consumption of steam at a modest level. The exit stream from the final bed contains, besides water, only hydrogen and hydrogen sulphide. If air is used instead of oxygen, then some nitrogen will also be present.

Regeneration of the sulphided sorbent with steam has a number of advantages compared to regeneration with for instance oxygen or air. Firstly, the process is almost thermoneutral compared to the strongly exothermic regeneration with air or oxygen. Secondly, the sulphur is recovered as pure hydrogen sulphide, H$_2$S, instead of for instance sulphur dioxide, SO$_2$. Additionally, steam and the raw synthesis gas do not form the explosive mixtures that air or oxygen would form with this gas.

The regeneration stream containing steam and hydrogen sulphide is transferred to the gasification reactor. This step is particularly beneficial because the hydrogen sulphide present in the regeneration stream is converted in the gasification reactor to calcium sulphide according to equation (1):

$$H_2S + CaO = H_2O + CaS \tag{1}$$

In this way conventional recovery of hydrogen sulphide from steam by condensing the hydrogen sulphide and transferring it to a Claus unit for production of elemental sulphur is avoided. Earlier methods of converting the hydrogen sulphide in the regeneration stream to concentrated sulphuric acid by a WSA unit are also avoided.

Before injection into the gasification reactor the steam may optionally be purified for sulphur by passing through a calcium oxide (CaO) purifier, whereby some of the hydrogen sulphide present in the steam may be converted to calcium sulphide according to reaction (1).

The regeneration stream containing steam and hydrogen sulphide is transferred directly from the regenerated solid sulphur sorbent to the gasification reactor at a pressure equivalent to the pressure of the gasification reactor. This is particularly advantageous as no extra pressure-increasing steps such as passage through for instance an ejector, are required.

Since the regeneration is carried out using steam at a pressure above the gasification pressure the regeneration stream containing steam, hydrogen and hydrogen sulphide may be injected directly into the gasifier without any problems.

The process of the invention is therefore simple requiring no external sulphur recovery equipment apart from the sulphur absorption vessels. The thermal efficiency is high since the steam is not condensed out, but merely transferred directly to the gasification reactor.

The sole drawing is a flow diagram of an embodiment of the process of the invention. Coal or fuel oil 1 is gasified in a gasification reactor 2 to produce a raw synthesis gas 3 of hydrogen, steam and carbon oxides. The gasification reactor also contains the sorbent material calcium carbonate. The raw synthesis gas 3 can optionally be subjected to a dust removal step 4, whereby particles of dust and fine ash 5 are removed. The raw synthesis gas 3 is then subjected to a halogen removal step 6 to prevent the formation of metal chlorides as explained earlier. Halogens 7 are removed. The raw synthesis gas 3 is further subjected to a water gas shift step 8, whereby the composition of the gas is adjusted to fulfill the requirements for their end use. A shifted gas 9 is produced.

The shifted gas 9 is then transferred to a sulphur absorption reactor 10 in which the sulphur content of the shifted gas 9 is reduced, resulting in a cleaned gas 11 suitable for use in the preparation of, for instance, methanol or ammonia. The sulphur absorption reactor 10 contains a sulphur sorbent which becomes sulphided during passage of the shifted gas through the sulphur sorbent.

The sulphided sulphur sorbent in the absorption reactor 10 is regenerated by passing a stream of steam 12 through the sorbent counter current to the flow direction of the shifted gas 9. The sulphur compounds present in the sulphided sorbent are thereby transferred to the steam primarily in the form of hydrogen sulphide.

The hydrogen sulphide containing stream of steam 13 is then transferred to the gasification reactor 2 for reaction of hydrogen sulphide with calcium carbonate present in the gasification reactor 2.

The invention claimed is:

1. A process for cleaning gases from a gasification unit comprising the steps of: gasifying a fuel to raw synthesis gas comprising carbon monoxide and steam in a gasification reactor in the presence of a calcium-containing compound and steam; removing halogen compounds from the raw synthesis gas; catalytic conversion of carbon monoxide and steam in the raw synthesis gas to carbon dioxide and hydrogen in a water gas shift conversion step to provide a shifted gas; contacting the shifted gas with a solid sulphur sorbent; regenerating the solid sulphur sorbent by passing a stream of steam through the solid sulphur sorbent counter current to the flow direction of the shifted gas to provide a hydrogen sulphide-containing stream of steam; transferring the hydrogen sulphide-containing stream of steam from the solid sulphur sorbent directly to the gasification reactor; and removing the cleaned shifted gas from the solid sulphur sorbent.

2. A process according to claim 1, wherein the calcium containing compound is dolomite or calcite.

3. A process according to claim 1, wherein dust and fine ash are removed from the raw synthesis gas prior to removal of halogens.

4. A process according to claim 1, wherein the water gas shift conversion step is carried out in the presence of a catalyst comprising supported molybdenum optionally containing cobalt or nickel.

5. A process according to claim 1, wherein the solid sulphur sorbent comprises supported tin oxides or a multilayer of supported sorbents.

6. A process according to claim 5, wherein the multilayer of sorbents comprises a first layer of a tin oxide based sorbent, a final layer of a metal and at least one intermediate layer.

7. A process according to claim 6, wherein the final layer is supported copper or nickel and the last intermediate layer before the final layer is a zinc oxide layer.

8. A process according to claim 5, wherein the support is selected from the group consisting of clays, silicates, alumina and titania.

9. A process according to claim 1, wherein the gasification reactor is an entrained reactor.

10. A process according to claim 1, wherein the pressure of the hydrogen sulphide-containing stream of steam from the solid sulphur sorbent is equivalent to the pressure in the gasification reactor.

* * * * *